United States Patent
Pfaffinger et al.

(10) Patent No.: US 10,060,762 B2
(45) Date of Patent: Aug. 28, 2018

(54) INDUCTIVE SENSOR COMPRISING INTEGRATED SOFT MAGNETIC LAYER AND METHOD FOR THE PRODUCTION THEREOF

(71) Applicant: MICRO-EPSILON Messtechnik GmbH & Co. KG, Ortenburg (DE)

(72) Inventors: Christian Pfaffinger, Rott (DE); Werner Groemmer, Ortenburg (DE); Karl Wisspeintner, Ortenburg (DE); Guenter Schallmoser, Ruhstorf (DE); Thomas Wisspeintner, Ortenburg (DE)

(73) Assignee: MICRO-EPSILON Messtechnik GmbH & Co. KG, Ortenburg (DE)

( * ) Notice: Subject to any disclaimer, the term of this patent is extended or adjusted under 35 U.S.C. 154(b) by 147 days.

(21) Appl. No.: 14/913,189

(22) PCT Filed: Jul. 4, 2014

(86) PCT No.: PCT/DE2014/200302
§ 371 (c)(1),
(2) Date: Feb. 19, 2016

(87) PCT Pub. No.: WO2015/028002
PCT Pub. Date: Mar. 5, 2015

(65) Prior Publication Data
US 2016/0209240 A1    Jul. 21, 2016

(30) Foreign Application Priority Data

Aug. 28, 2013  (DE) .................. 10 2013 217 150
Feb. 4, 2014   (DE) .................. 10 2014 201 975

(51) Int. Cl.
*G01B 7/30* (2006.01)
*G01D 5/20* (2006.01)
*G01D 5/22* (2006.01)

(52) U.S. Cl.
CPC ............ *G01D 5/20* (2013.01); *G01D 5/2033* (2013.01); *G01D 5/2241* (2013.01)

(58) Field of Classification Search
CPC ......................................... G01D 5/20
(Continued)

(56) References Cited

U.S. PATENT DOCUMENTS

| 6,605,939 B1 | 8/2003 | Jansseune et al. |
| 2010/0090688 A1 | 4/2010 | Mednikov |
| 2011/0227561 A1 | 9/2011 | Mednikov |

FOREIGN PATENT DOCUMENTS

| CN | 101563585 A | 10/2009 |
| CN | 102257362 A | 11/2011 |

(Continued)

OTHER PUBLICATIONS

The International Bureau of WIPO, International Preliminary Report on Patentability (English translation of ISA's Written Opinion) for International Application No. PCT/DE2014/200302, dated Mar. 1, 2016, 10 pages, Switzerland.

(Continued)

*Primary Examiner* — Reena Aurora
(74) *Attorney, Agent, or Firm* — Alston & Bird LLP (57) ABSTRACT

The invention relates to a sensor element for an inductive sensor used for a displacement or distance measurement by means of a magnetic field that varies according to the distance from the measurement object but that remains temporally constant. In said sensor, thin ferromagnetic material is integrated into a substrate. The invention also relates to a sensor comprising said sensor element and to a method for producing the sensor element.

22 Claims, 7 Drawing Sheets

Copper surface filled
Soft magnetic foil
Sensor coil

Sensor coil
Soft magnetic foil
Copper surface filled

Printed circuit board layer structure in the sensor module (58) Field of Classification Search
USPC .................................................. 324/207.15
See application file for complete search history.

(56) References Cited

FOREIGN PATENT DOCUMENTS

| | | |
|---|---|---|
| DE | 19621886 A1 | 12/1997 |
| DE | 102005007731 A1 | 8/2006 |
| DE | 102007062862 A1 | 7/2008 |
| JP | S56-092412 A | 7/1981 |
| WO | WO 2007/003913 A2 | 1/2007 |
| WO | WO 2008/074317 A2 | 6/2008 |

OTHER PUBLICATIONS

Japan Patent Office, Notification for Reasons for Refusal for Application No. 2016-537134, dated Jun. 6, 2017, 4 pages, Japan.
Japan Patent Office, Notification for Reasons for Refusal for Application No. 2016-537134, dated Dec. 13, 2016, 6 pages, Japan.
State Intellectual Property Office of the P.R.C., First Office Action, including search report, for Application No. 201480047911.8, dated Dec. 28, 2016, 24 pages, China.
International Searching Authority, International Search Report (ISR) and Written Opinion for International Application No. PCT/DE2014/200302, dated Nov. 19, 2014, 14 pages, European Patent Office, The Netherlands.

Fig. 1

Magnetic permeability μ over magnetic field strength H from [Boll, Richard: Weichmagnetische Werkstoffe. Vacuumschmelze GmbH, 4th edition, May 1990]

Printed circuit board layer structure in the sensor module

Foil strip is inserted as a strip during the production of the circuit board

INDUCTIVE SENSOR COMPRISING INTEGRATED SOFT MAGNETIC LAYER AND METHOD FOR THE PRODUCTION THEREOF

CROSS REFERENCE TO RELATED APPLICATIONS

This application is a national stage application, filed under 35 U.S.C. § 371, of International Application No. PCT/DE2014/200302, filed Jul. 4, 2014, which claims priority to German Application No. 10 2014 201 975.3 filed Feb. 4, 2014 and German Application No. 10 2013 217 150.1 filed Aug. 28, 2013, the contents of both as are hereby incorporated by reference in their entirety.

BACKGROUND

The invention concerns a sensor element for an inductive sensor for path or distance measurement, a sensor that encompasses the sensor element, as well as a process for the manufacture of the sensor element and of the sensor.

From practice, MDS sensors for standard applications that are realized with plane coils on a PCB base are familiar. In this MDS variant, a thin ferromagnetic foil is attached to a measuring coil or to a transmitter. This can take place in various ways. The following are previous solutions, as they are familiar from practical application:

The ferromagnetic foil is affixed to a foil carrier by means of an adhesive layer (double-sided tape or carrier strip with adhesive layer). The foil carrier is preferably a circuit board that features a copper surface (eddy current sensor) or a further coil or two conductor lines lying next to one another (transmitters) directly under the area to which the foil is to be applied. In order to minimize interference, e.g. through contact, the copper surface must be lain on a confirmed potential with respect to the evaluation electronics, or there must be contact with the additional coil. In either case it is necessary to create possibilities for contact. Manual processing is practicable for small quantities.

BRIEF SUMMARY

The present invention is based on the task of specifying a sensor element for an inductive sensor for path or distance measurement, a sensor that encompasses the sensor element as well as a procedure for the manufacture of the sensor element and of the sensor, whereby automated production, especially production for greater quantities, is possible with reproducible results.

It is intended that the sensor element and the sensor be cost-effective to produce.

The object mentioned above is solved with the characteristics of the coordinated patent claims 1, 8, and 13. Accordingly, the sensor element according to the invention represents one that is distinguished by a magnetic field that changes according to the distance to the measurement object but is temporally constant. A ferromagnetic material is integrated into a substrate in the process.

BRIEF DESCRIPTION OF THE FIGURES

There are various options for equipping and implementing the teaching of the present invention in an advantageous manner. On this topic, reference should be made on the one hand to the various dependent claims provided herein, and on the other hand, to the following description of preferred embodiments of the invention with the help of the drawing. Along with the explanation of the preferred exemplary embodiments of the invention based on the drawing, other generally preferred embodiments and implementations of the teaching are explained as well. The drawings show:

DETAILED DESCRIPTION OF VARIOUS EMBODIMENTS

Figure 1:
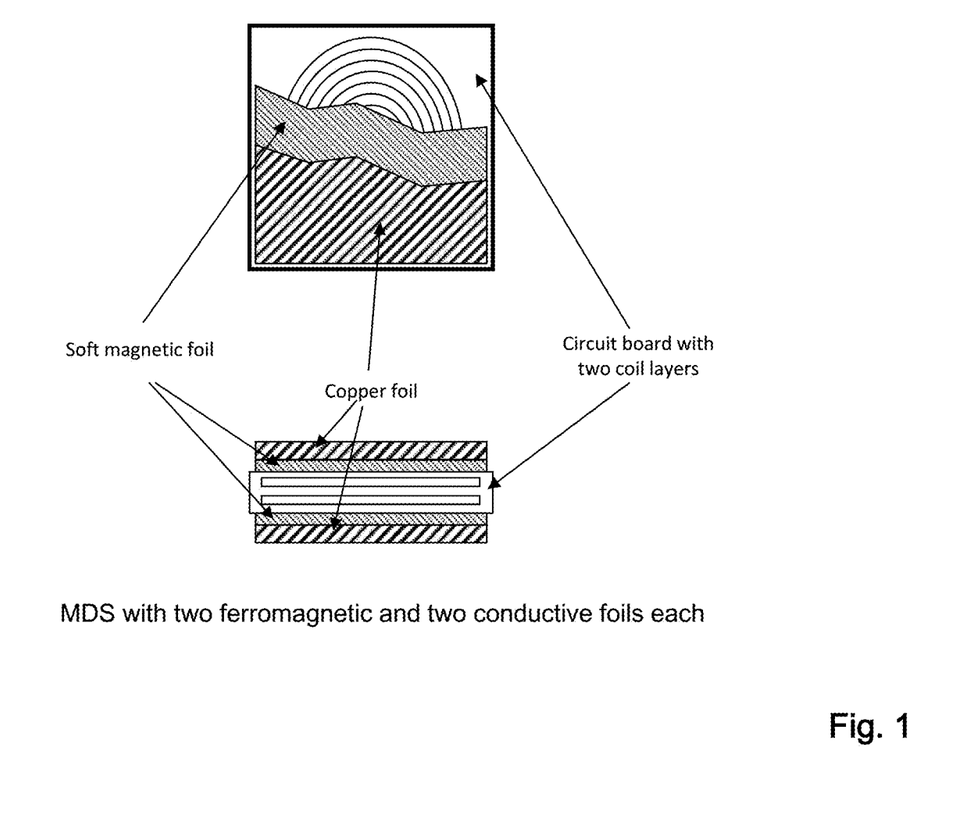
FIG. 1 a schematic view of an exemplary embodiment of a flat sensor according to the invention with a sensor element according to the invention, concretely an MDS with two ferromagnetic and two conductive foils respectively, FIG. 2 a schematic diagram of the plot, well-known considered on its own, of magnetic permeability μ over the magnetic field strength H, FIG. 3 a schematic view of an exemplary embodiment of a sensor according to the invention with a sensor element according to the invention, whereby the foil carrier is assembled on a circuit board with a coil, FIG. 4 a schematic view of a further embodiment, according to which a foil pack is applied to a circuit board, FIG. 5 a schematic view of a circuit board layer structure, FIG. 6 a schematic view of a foil strip that is inserted during the production of the circuit board as a strip and FIG. 7 a schematic view of an MDS for high-temperature applications.

The implementation of a flat sensor comes closest to the requirements arising from the underlying task. In the simplest case, the structure is composed of a foil and a plane coil. This can be improved with respect to sensor sensitivity through the addition of a further foil on the side of the coil not yet covered. A further magnification of effect is achieved through the additional attachment of a conductive, non-ferromagnetic foil (e.g. made out of copper or aluminum) to the respective sides of the soft magnetic foil that are turned away from the coil. This is shown in FIG. 1.

The coil is operated within a frequency range in which the depth of penetration is of the same magnitude as the thickness of the foil. The plot of the relative permeability dependent on the field strength, and thus on the influencing magnetic field, is shown by way of example in FIG. 2. As the magnet approaches and after passing its maximum value, the relative permeability falls. The falling slope is the working range for the MDS. As a result of this, the penetration depth increases in the soft magnetic foil, as is easily comprehensible via the calculation of the penetration depth for eddy currents. Because the soft magnetic foil is conductive, eddy currents form within it that develop into an opposing field to the magnetic field of the eddy current sensor. In order to keep the pre-attenuation arising from this as low as possible, the foil should display as little conductivity as possible.

At the beginning of the working range, that is, when the magnet is further away, the permeability is high and the penetration depth low, such that the eddy current sensor is influenced virtually exclusively by the permeability of the foil. This leads to a heightening of the inductivity of the coil. At the end of the working range, that is, when the magnet is much closer, the permeability is very low, such that the attenuating characteristics of the conductivity (opposing field) predominate. At the same time, the penetration depth increases beyond the thickness of the foil, which bears the consequence that the eddy currents decrease and thus also the opposing field becomes weaker. This leads to a weakening of the measuring effect. The additional conductive, non-ferromagnetic foil according to the embodiment in FIG. 1 leads, in the case of penetration depths that exceed the thickness of the soft magnetic foil, to additional eddy currents that, with the advantage of the low specific resistance and a relative permeability of nearly 1, still influence the coil even when the penetration depths go beyond the ferromagnetic foil. This counteracts the reduction of the measuring effect that was determined by the change in permeability.

The eddy current sensor then behaves in the case of very little magnet distance in a way comparable with the way it would if it were to measure against conductive material with little distance, thus as if the ferromagnetic foil were not present. The eddy current sensor coil then has the least inductivity. The symmetrical structure on both sides of the eddy current sensor, under the influence of the magnet, gives rise to a very large change in impedance that can easily amount to more than 100%. Such a large measuring effect leads to high resolution and sensor sensitivity. From this, it can clearly be understood that the resulting sensor characteristics are also dependent on the structure-related parameters. Through a skilful arrangement of coil and foil, as well as through the design of the shape and form, a nearly linear relationship can be produced over the falling slope of the permeability between the magnet distance and the measuring signal.

Figure 2:
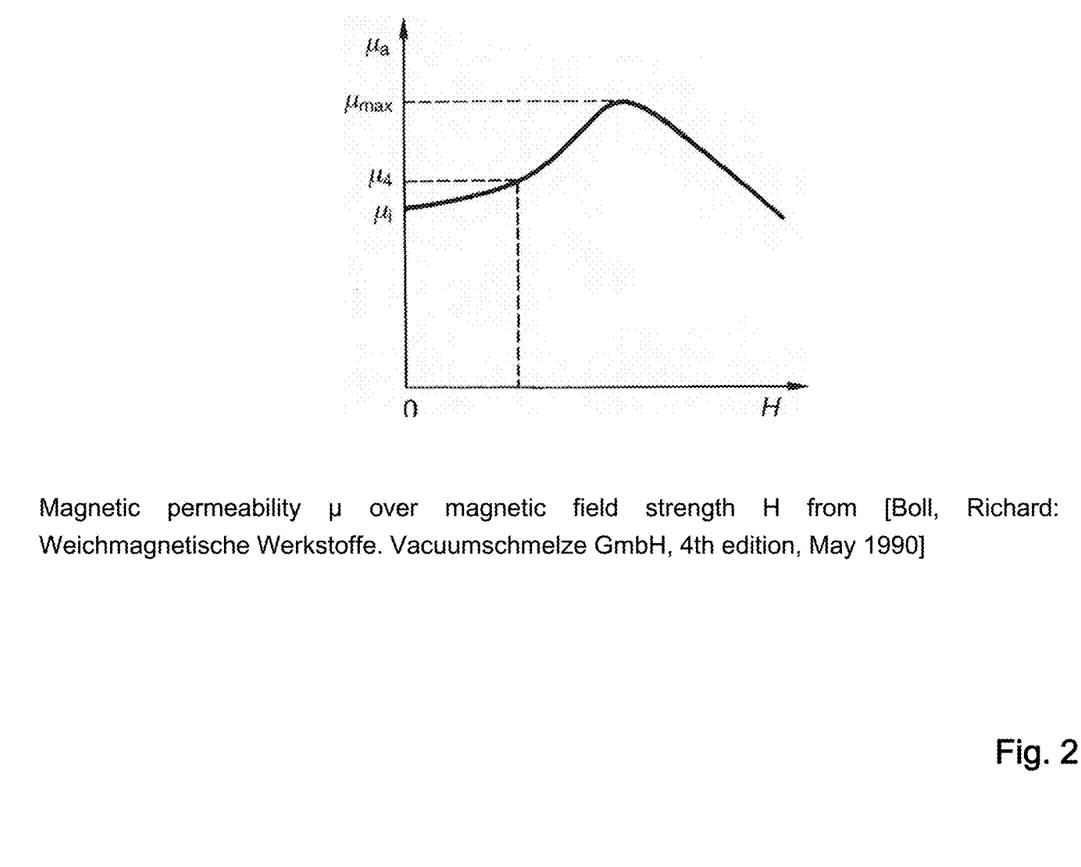

If it is built as a "transmitter", the functionality of the MDS can be described likewise for the penetration depth and thus the shielding effect. The ferromagnetic foil is located between two coils, each of which, in order to provide an economical solution, is implemented using printed circuit technology. With the principal characteristic curve shown in FIG. 2 and assuming that work only occurs to the right of $\mu_{max}$, the following effect is yielded:

In the case of a large magnet distance, the effective $\mu_r$ in the foil is also large, and thus also the shielding effect. The coupling factor of the first coil (primary coil) on the second coil (secondary coil) is small. The transmitted voltage amplitude is thus small. As the magnet approaches, the relative permeability decreases all the way to a minimum value that corresponds to the nearest possible position to the magnet. In this case, the relative permeability is minimal and thus the magnetic coupling between the primary side and the secondary side maximal. The voltage amplitude measurable on the secondary coil is then at its maximum. A signal amplification can be achieved simply via the turns ratio between the two coils. This structure also shows a very large sensitivity to the magnet's position and offers the additional advantage that no impedances, but rather only current or voltage amplitudes have to be analyzed. Here too, it is clear that the structural tolerances directly respond to the reproducibility of the sensor element. The transmitter can, in a minimal configuration, also be realized in the form of only two strip conductors located close next to one another that are coupled via the soft magnetic foil.

In order to keep the scattering as low as possible in both cases and nevertheless be able to do without trimming, it is necessary to implement the construction of such a sensor in a secure production process.

Figure 3:
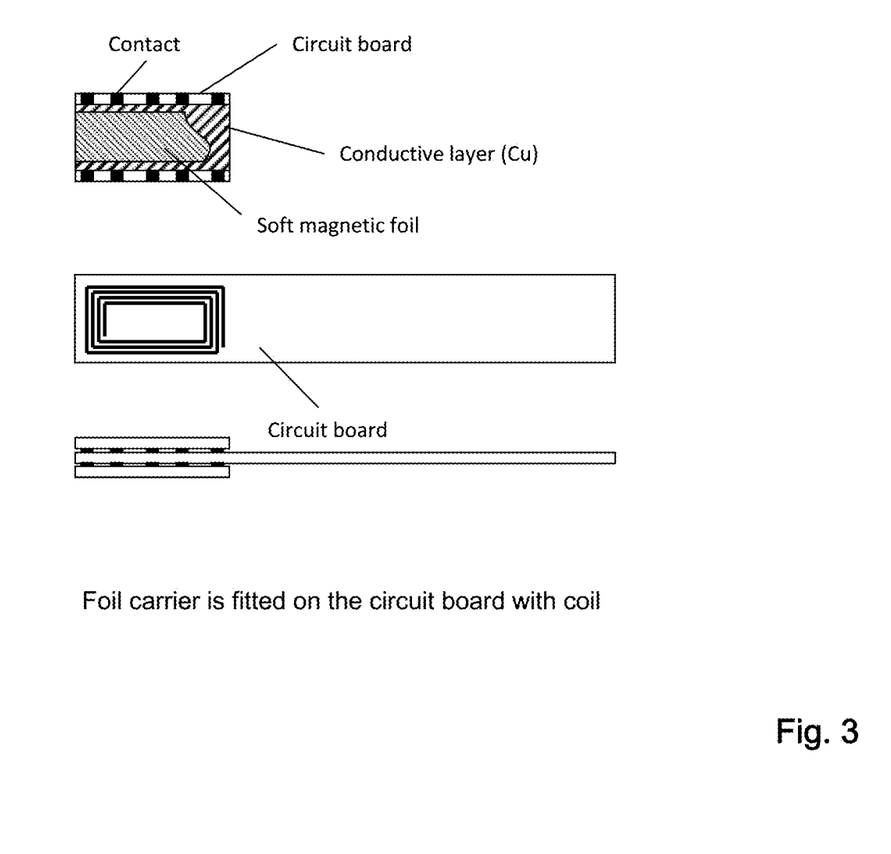

If the foil carrier is realized as a circuit board as in FIG. 3, this can contain a laminated copper foil. The soft magnetic foil is applied onto the reverse side of the plate, that is, onto the printed circuit board side. The plate is assembled as a circuit board. The coil is integrated. Through soldering paste or through a soldering process, the distance of the plate and thus of the foil to the coil is only conditionally reproducible.

If the foil carrier is realized as a plate, soldering surfaces can be attached laterally or on the reverse side. It should be noted that these soldering surfaces feature a certain gap, dependent on the adhesive layer and the ferromagnetic foil, to the measuring plane coil. This can only be bridged by a corresponding application of soldering paste on the abovementioned embodiments. With this, an automated, standardized assembly is possible. Because the spacing between the measuring coil to the ferromagnetic foil directly responds to the measurement result, a heightened scattering among the measuring elements produced in this way must be taken into account due to the gap tolerance contingent upon the process fluctuations and the heightened application of soldering paste. The additional weighing down or bracing of the foil carrier during the soldering process can make an improvement. This is, however, additional effort and is opposed to standardized manufacturing.

Figure 4:
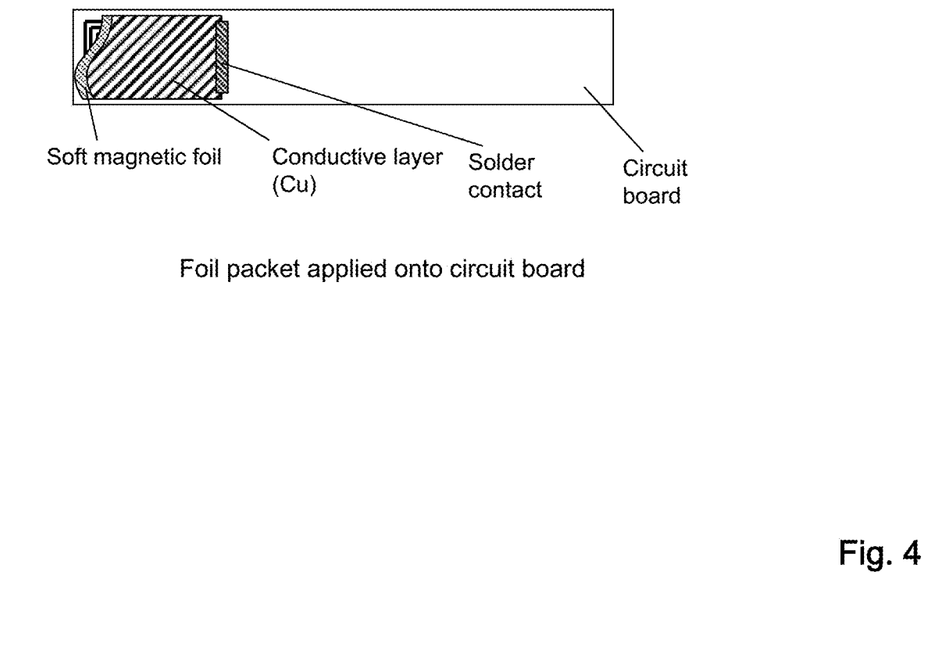

An improvement can be extracted from the embodiment according to FIG. 4, according to which soft magnetic foil is mounted onto copper foil (without a plate) as an element. More precisely, here the foil carrier is realized as a further conductive foil (only possible in the variant with the additional conductive layer). In an upstream process step, the ferromagnetic foil is applied to a conductive foil (copper, aluminum, etc.) with the aid of an adhesive layer. This could take place, for example, in a roll-to-roll process. The foil packet arrived at in this way can likewise be assembled automatically. An additional instance of pressure is useful for process stability. The contacting of the copper surface is given by a soldering point onto the copper foil. For this process, the following possibilities exist:

The foil packet covers the soldering paste printing at the edges, whereby the copper foil should project over the ferromagnetic foil or an additional partial soldering should be downstream of the actual soldering process. This guarantees the secure conductive connection between the foil parts of equal size. In addition to the effects of the material variations, the spacing between the sensor elements is influenced primarily by the placement accuracy of the foil packet relative to the measuring coil. But a change in the thickness of the adhesive layer also affects the control, even if to a markedly lesser degree as the aforementioned spacing in the soldering process.

Figure 5:
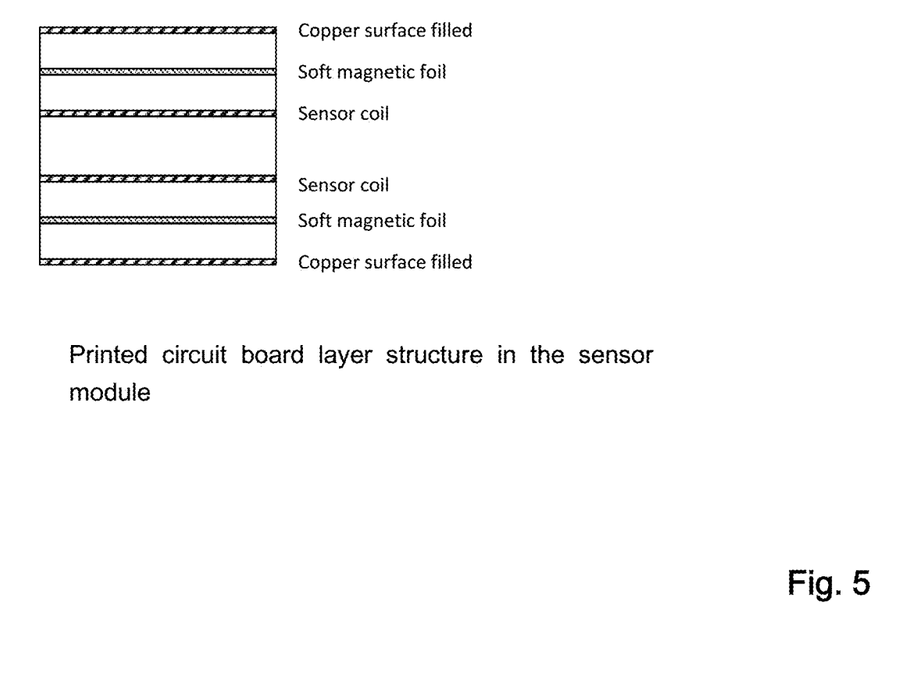
Figure 6:
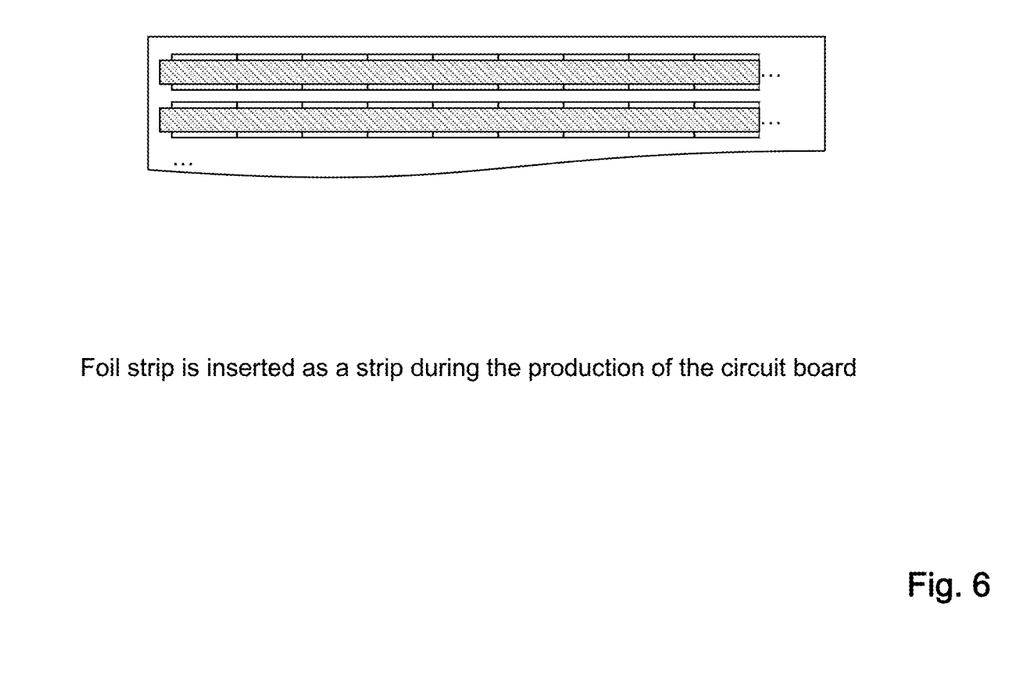

A notable step toward allowing the manufacturing process to take place in a standardized process can be detailed with regard to FIG. 5, according to which the coil, the soft magnetic foil and, if applicable, the copper foil are integrated in a circuit board or plate. This goal of this is to create a sensor module that, like a structural component, can be placed on any circuit board or more generally on any circuit carrier. The coil is once again produced through circuit board construction:

After the coil layers and one or more insulation layers, the ferromagnetic foil is laid in (cf. FIG. 6). One (or more) further isolation layers are located on top of the ferromagnetic foil. The simplest sensor module can be constructed in this way. A further conductive layer or coil layer(s) allow for a structure as was described at the beginning (transmitter or eddy current sensor).

In order to further increase the sensitivity of the sensor module with the additional copper layer, the layer structure can be supplemented symmetrically to the coil layer in the other direction. The outer copper surface can be protected by means of an additional varnish (solder resist). The coil and foil geometry as well as the module dimensions and the spacing between the functional parts of the sensor module can be adjusted to the applicable measurement requirements. The coil connections and the contact surfaces for the conductive surfaces can be realized laterally by metallizing the edges or also on the surfaces. A lateral contacting option simplifies the optical test after assembly in the automated process, stabilizes the structure through the additional connection of the individual layers and can be produced with only a minimal enlargement of the sensor module. Both contact variants allow for automated mounting on the surface (SMD). The ferromagnetic material is either in tape form or in the form of a flat foil.

If in tape form, the material should in the simplest case be cut into suitable strips before being introduced, whereby strip length can correspond to a multiple of the sensor module length. The cutting to the desired module length takes place through the separation of the finished sensor module in the production panel. If through-connections in the area of the foil are necessary and an electrical contact to the foil must be avoided, which is the case if signal lines are to be run or the coil continued in another place, then the ferromagnetic strip must be processed in the corresponding areas, e.g. through a punching-out. The through-connection necessary for the production of the coil can, however, also be implemented as a "blind via", making further mechanical processing of the foil unnecessary. The laying in of additional strips or free forms is customary especially in the production of so-called "rigid-flex circuit boards".

If the material is flat, the desired structure can be punched out, and the alignment marks for the entire production panel can be taken into account. The material can then be laid in directly as an individual layer. In this way, it is ensured that existing quantity processes are used for the construction and processing of the sensor module and only have to be minimally adjusted. This technology can also be used to integrate the sensor module and the evaluation circuit onto the same circuit board. Then the additional assembly of the sensor element becomes unnecessary. It should, however, be considered that a separation of the two functional units is helpful, depending on the design of the circuit and the quantity.

Further relevant characteristics for the integration into the circuit board include
- the protection of the sensor element/integration of the foil into the circuit board, protection from environmental influences;
- an automated process permits lower tolerances; tolerances are smaller, reproducibility, defined spacings between foil and coil;
- cost-effective series production even in moderate quantities;
- sensor element is integrated in one circuit board together with the evaluation circuit;
- greater miniaturization and integration (evaluation circuit on top of the sensor element); integration of the sensor element into the circuit board allows the placement of the evaluation electronics on the surface of the circuit board. This leads to a reduction in the space required;
- additional copper foil to increase the sensitivity already a component of the process; the introduction of a copper layer into the plate corresponds to the standard in manufacturing, resulting in a cost advantage;
- through the orientation of the foil, the linearity can be influenced; the length, width or form of the foil or of the coil can be used in order to selectively set or influence the characteristic curve;
- the production of a strip conductor sensor (two parallel strip conductors are also possible); blind transformer is realizable as transmitter.

A further possibility for a sensor module that can be manufactured with established standard processes, and also accomplishes the development objective of an increased temperature range, can be achieved by combining the ferromagnetic material necessary for measurement with ceramic circuit carriers. In order to be able to implement this, it is necessary to use ferromagnetic material that can cover a larger temperature range. Amorphous materials already display a fundamental change in magnetic properties at temperatures far below the Curie temperature. Nanocrystalline materials have comparable properties and are suitable for use at high temperatures. These additionally display a still higher saturation induction, thus allowing an expansion of the measurement area in the case of a comparable geometry (coil and foil). These materials have the disadvantage, however, that, although their desired magnetic properties are ensured after thermal treatment, they become mechanically very unstable. Further processing in this state is difficult and impedes a secure process for the production of a high-temperature sensor element. If, however, the foil can be processed to the greatest possible extent before the thermal treatment, this disadvantage plays no role, as the basis material for the nanocrystalline foil is in an amorphous state before the thermal treatment and is thoroughly mechanically durable, and thus markedly easier to handle.

Figure 7:
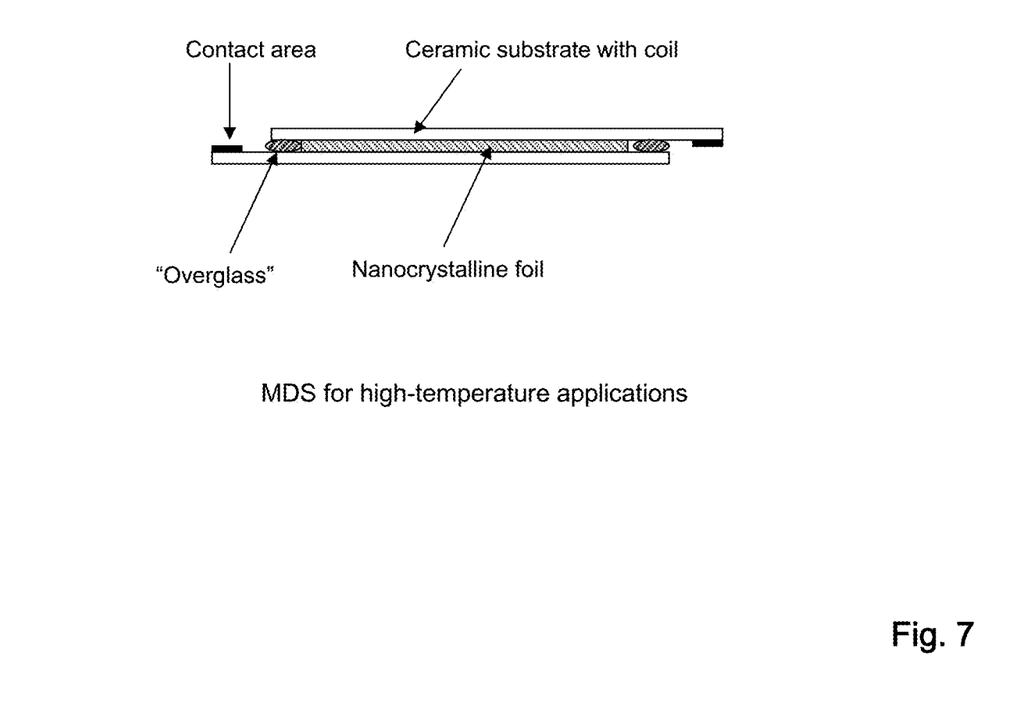

As in the integration into the circuit board, it can be produced with standard technologies as follows:

On a ceramic substrate, using familiar thick-film technology, the desired coil geometry is applied and "burned" in accordance with the illustration in FIG. 7. A final insulating layer (e.g. Overglass) covers the coil. Subsequently, one or several layer(s) of further printing with "Overglass" (glazing compound—actually for the protection of the ceramic as a final layer) are applied around the circumference of the coil and of the later position of the nanocrystalline foil. The thickness of the application should orient itself to the thickness of the nanocrystalline foil that was previously cut to the appropriate size. The piece of foil is deposited into the area that thus remains free. A further ceramic substrate should cover the described area. The second ceramic substrate can, like the first, be printed with a coil so that either the inductivity rises through a series of connections, or a "transmitter" structure can be implemented. The necessary thermal treatment of the amorphous base simultaneously brings about a subsequent hardening of the "Overglass", so that afterward, a hermetically sealed nanocrystalline piece of foil results, integrated in the ceramic. A further advantage of this method is that the need for shielding gas during the thermal treatment is not mandatory. The danger of a corrosion of the material during the thermal treatment is reduced quite significantly by the airtight seal in the ceramic.

A structure that also meets the requirements connected with high temperatures is the production of the sensor element using LTCC technology. Here, there likewise exists the possibility of producing the relative position of a coil to a ferromagnetic material. The ferromagnetic material is, in the ideal case, a ceramic foil displaced with amorphous material, which is sintered with a sensor coil using the multi-layer structure customary in LTCC technology. In this case, too, the advantages are the use of standard technology in order to be able to offer an efficient solution with a reliable process. The layer structure can, as in the case of the circuit board construction, be further optimized. For example, the sequence of layers is as follows in the case of a transformer structure for the sensor:

Starting with a surface layer, coil layer(s), insulation layer(s), ferromagnetic layer, isolation layer(s), coil layer(s), surface layer allows the LTCC technology, however, also allows for the construction described in circuit board production with only one coil, but with the helpful supplement of a conductive layer: Surface layer, conductive layer, (possibility of insulation layer(s)—not necessary for functionality), ferromagnetic layer, isolation layer(s), coil layer(s), insulation layer(s), (possibility of insulation layer(s)—not necessary for functionality), conductive layer, surface layer.

Because the processing of ferromagnetic materials always makes new approaches possible, an integration of the sensor principle in an IC is the next step. An integrated inductivity, already familiar from the field when considered alone, can be used as the basis for a sensor module according to the MDS principle. The coil is manufactured in a standardized process. The application of a ferromagnetic layer directly onto a wafer completes the sensor approach. For instance, in the field, a new magnetic material is known that allows inductivities that are only 150 µm high. In this way, a power supply integrated on a chip is almost within reach. This material represents an amorphous iron-cobalt alloy (FCA for Fe—Co alloy). The interesting thing about it is that the FCA material can very easily be separated on a silicon wafer by means of a galvanic process—as is familiar from the production of hard disks. With the help of this process, the production costs can be kept at a low level. The completely coated wafer is isolated into the magnet dies, and the dies migrate onto a substrate on which a copper spiral has already been applied. Now, all that remains is for the controller IC with the integrated MOSFETs to be set onto this substrate or directly onto the magnet chip. The power supply is completed on the chip. The traditional coils or respectively the inductances that until now have defined the size of the switched power supply are no longer necessary. If this technology is used, an integrated circuit can be produced together with the sensor coil and the ferromagnetic material in one chip and made available to the mass market, as with AMR/GMR sensors. Integrating temperature compensation, linearization and calibration is expedient. Through the marked reduction in the dimensions, the sensors will feature higher sensitivity but also a smaller measuring range. The sensor element can, however, easily be cascaded and offset. Because, depending on the evaluation circuit, the quality of the inductivity is not crucial, the coil can also be manufactured directly on the silicon.

With regards to further advantageous embodiments of the sensor element or of the sensor with a sensor element and of the process for the manufacture of the sensor element according to the invention, for the purpose of avoiding repetition, reference is hereby made to the general portion of the description and to the attached claims.

Finally, explicit reference is made to the fact that the embodiments of the sensor element or of the sensor with a sensor element and of the process for the manufacture of the sensor element according to the invention, described above, merely serve to explain the claimed teaching, but the teaching is not restricted to the embodiments.

The invention claimed is:

1. Sensor element for an inductive sensor for at least one path or distance measurement using a magnetic field that changes according to the distance to the measuring object but is constant over a period of time, whereby thin ferromagnetic material is integrated into a substrate, whereby the sensor element features a plane coil, a soft-magnetic foil that covers at least one side of the plane coil, and a conductive foil that covers at least one side of the soft-magnetic foil, wherein:
the substrate is a circuit board, a plate, or a ceramic substrate,
the plane coil is integrated into the circuit board, the plate, or the ceramic substrate,
the soft-magnetic foil, which covers the plane coil, is integrated into the circuit board, the plate, or the ceramic substrate, and
the soft-magnetic foil is positioned intermediate the plane coil and the conductive foil.

2. Sensor element according to claim 1, wherein the soft magnetic foil, which covers the plane coil, is arranged on both sides of the plane coil.

3. Sensor element according to claim 2, wherein:
the conductive foil is arranged on both sides of the plane coil, and
the soft-magnetic foil, on each of the both sides of the plane coil, is positioned intermediate the conductive foil and the plan coil.

4. Sensor element according to claim 3, wherein the conductive foil is made of either copper or aluminum.

5. Sensor element according to claim 1, wherein the plane coil is formed at least one of in one layer or in multiple layers.

6. Sensor element according to claim 1, wherein two plane coils are provided and a ferromagnetic foil is further arranged between the two plane coils.

7. Sensor element according to claim 6, wherein the two plane coils are implemented using printed circuit technology.

8. Sensor element according to claim 1, wherein the conductive foil serves as foil carrier on which the soft-magnetic foil is applied.

9. Sensor element according to claim 8, wherein the conductive foil is a copper foil.

10. Sensor with a sensor element according to claim 1, wherein the circuit board, encompassing a laminated copper coil, serves as foil carrier, whereby on the reverse side of the plate, on the circuit board side, a soft magnetic foil can be mounted, and whereby the coil is integrated into the printed circuit board configuration using soldering technology.

11. Sensor with a sensor element according to claim 10, wherein the soft magnetic foil is affixed on the reverse side of the plate.

12. Sensor with a sensor element according to claim 10, wherein the coil can be integrated into the printed circuit board configuration with bridging soldering paste.

13. Sensor with a sensor element according to claim 10, wherein the copper foil is integrated into at least one of the circuit board or the plate.

14. Sensor according to claim 10, wherein the sensor forms a sensor module that is at least one of arranged on the circuit board, arranged on a circuit carrier, or integrated into either the circuit board or the circuit carrier.

15. Process for manufacturing a multi-layered sensor element, said process comprising the steps of defining a layer structure by:
integrating at least one coil layer and one or more insulation layers into a substrate that is one of a circuit board, a plate, or a ceramic substrate;
covering at least one side of the coil layer with a ferromagnetic foil by positioning the ferromagnetic foil adjacent the at least one side of the substrate;
applying a further insulation layer to at least one side of the ferromagnetic foil, such that the ferromagnetic foil is intermediate the further insulation layer and the coil layer; and
covering at least one side of the ferromagnetic foil with a conductive foil, such that the ferromagnetic foil and the further insulation layer are positioned intermediate the coil layer and the conductive foil.

16. Process according to claim 15, wherein the layer structure is defined supplemented in both directions on both sides of the substrate, in a way symmetrical to the at least one coil layer.

17. Process according to claim 16, wherein the layer structure is supplemented on both sides through two ferromagnetic foils and two conductive foils that are each either a copper surface or a copper foil.

18. Process according to claim 15, wherein the layer arrangement is protected by an additional layer of varnish.

19. Process according to claim 18, wherein the additional layer of varnish is provided on both sides of the layer arrangement.

20. Process according to claim 15, wherein the coil connections and contact areas are produced for the conductive surfaces either by metallizing the edges laterally or by means of metal through-connections.

21. Process according to claim 15, wherein the material is initially in tape form and is cut into suitable strips, whereby the strip length can correspond to a multiple of the length of the sensor module.

22. Process according to claim 21, wherein the cutting to the desired module length takes place through the separation of the finished sensor module in the production panel.

* * * * *